(12) United States Patent
Nakashima et al.

(10) Patent No.: US 10,433,380 B2
(45) Date of Patent: Oct. 1, 2019

(54) TRIAC DRIVING CIRCUIT AND FIXING APPARATUS HAVING RESISTIVE ELEMENTS IN SERIES WITH DIFFERENT CHARACTERISTICS FOR CIRCUIT PROTECTION

(71) Applicant: CANON KABUSHIKI KAISHA, Tokyo (JP)

(72) Inventors: Yusuke Nakashima, Yokohama (JP); Takao Kawazu, Susono (JP); Tetsuya Yamamoto, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/259,840

(22) Filed: Jan. 28, 2019

(65) Prior Publication Data

US 2019/0239301 A1 Aug. 1, 2019

(30) Foreign Application Priority Data

Jan. 31, 2018 (JP) .................................. 2018-015195

(51) Int. Cl.
  *G05F 5/06* (2006.01)
  *H05B 33/08* (2006.01)
  *H02M 5/275* (2006.01)

(52) U.S. Cl.
  CPC ........ *H05B 33/0818* (2013.01); *H02M 5/275* (2013.01); *H05B 33/089* (2013.01); *H05B 33/0821* (2013.01)

(58) Field of Classification Search
  CPC ...................................................... H02M 5/275
  USPC .................................................. 323/217, 300
  See application file for complete search history.

(56) References Cited

U.S. PATENT DOCUMENTS

| 5,053,907 A | * | 10/1991 | Nishi | ................... H01H 9/542 307/134 |
|---|---|---|---|---|
| 2006/0158130 A1 | * | 7/2006 | Furukawa | .......... H05B 33/0815 315/200 R |
| 2012/0155895 A1 | * | 6/2012 | Shimura | ............ G03G 15/5004 399/33 |

FOREIGN PATENT DOCUMENTS

| JP | 10-241830 A | 9/1998 |
|---|---|---|
| JP | 10-333755 A | 12/1998 |
| JP | 2006-42541 A | 2/2006 |
| JP | 2015-194713 A | 11/2015 |

* cited by examiner

*Primary Examiner* — Thuy V Tran
(74) *Attorney, Agent, or Firm* — Canon U.S.A., Inc. IP Division

(57) ABSTRACT

A triac driving circuit according to an embodiment of the present disclosure includes a phototriac coupler, a first resistive element, and a second resistive element, which are connected in series to a gate terminal of a triac. A minimum resistance of the first resistive element including tolerance is higher than a maximum resistance of the second resistive element including tolerance.

14 Claims, 11 Drawing Sheets

TRIAC DRIVING CIRCUIT AND FIXING APPARATUS HAVING RESISTIVE ELEMENTS IN SERIES WITH DIFFERENT CHARACTERISTICS FOR CIRCUIT PROTECTION

BACKGROUND OF THE INVENTION

Field of the Invention

The present disclosure relates to a triac driving circuit that controls power to be supplied to a load and to a fixing apparatus including the triac driving circuit.

Description of the Related Art

An example of a power supply apparatus that supplies power from a commercial alternating current power source to a load is a type of apparatus that controls the power to be supplied to the load by controlling the driving of a bidirectional thyristor (hereinafter referred to as a triac). An example of the power supply apparatus has a configuration for driving the triac via "a phototriac coupler that ensures electrical insulation between the primary side and the secondary side" (Japanese Patent Laid-Open No. 2015-194713). The triac is driven by transmitting a driving signal to a triac driving circuit including the phototriac coupler.

A terminal T1 and a terminal T2 of the triac are connected in series between the commercial alternating current power source and the load. Between the gate terminal G and the terminal T2 of the triac, the primary side of the phototriac coupler and one resistive element are connected in series. This resistive element serves as a bias resistor for turning on the triac.

The time from when the light emitting side of the phototriac coupler emits light until when the output side of the phototriac coupler is completely turned on depends on the phototriac coupler used. In the case where a phototriac coupler that is short in that time is used, a voltage is applied to the phototriac coupler until the triac is completely turned on. For this reason, the pulse voltage applied to the bias resistor is low. In the case where a phototriac coupler that is short in that time is used, the phototriac coupler is completely turned on before the triac is completely turned on, so that a voltage is applied to the bias resistor. For that reason, the pulse voltage applied to the bias resistor is high.

Thus, when the phototriac coupler is turned on and the triac is turned on, a high pulse voltage can be applied to the bias resistor. For that reason, it is necessary to use a bias resistor with high rated power that can withstand this pulse voltage.

When an abnormality occurs in which a short circuit occurs between the terminal T1 and the gate terminal G, not a power supply circuit from the alternating current source to a heater via the terminal T1 and the terminal T2, but a power supply circuit from the alternating current source to the heater via the phototriac coupler is formed. If such a circuit is formed, a large voltage can be applied to the elements (peripheral elements) in the circuit to damage the elements. For that reason, the bias resistor also has a role of protecting the elements from a large voltage (dividing the voltage).

However, to satisfy both of the function of normally driving the triac and the function of protecting the peripheral elements, the bias resistor needs high rated power and high resistance. This results in low flexibility in selecting the bias resistor. For example, in selecting an inexpensive, small resistive element with high rated power, an element with high resistance has to be selected.

If such an inexpensive resistive element having high resistance is used as the bias resistor between the gate terminal G and the terminal T2, the following problem occurs. If an abnormality occurs in which a short circuit occurs between the terminal T1 and the gate terminal G, the voltage of the alternating current source is applied as it is to the bias resistor. At that time, the inexpensive bias resistor is broken in such a manner that the bias resistor is not immediately opened (broken) but is temporarily short-circuited before being opened or before the resistance increases. At this temporary short circuit, an excessive short-circuit current flows to the phototriac coupler, which is an insulation element, to cause damage to the phototriac coupler (dielectric breakdown). A measure against the problem includes using a fuse resistor that is easily opened when an excessive voltage is applied as the bias resistor. However, this increases the cost.

SUMMARY OF THE INVENTION

A triac driving circuit according to an aspect of the present disclosure includes a triac connected between an alternating current source and a load, a phototriac coupler configured to transmit a signal to the triac, a first resistive element, and a second resistive element. The phototriac coupler, the first resistive element, and the second resistive element are connected in series to a gate terminal of the triac. A minimum resistance of the first resistive element including tolerance is higher than the maximum resistance of the second resistive element including tolerance.

A triac driving circuit according to an aspect of the present disclosure includes a triac connected between an alternating current source and a load, a phototriac coupler configured to transmit a signal to the triac, a first resistive element, and a second resistive element. The phototriac coupler, the first resistive element, and the second resistive element are connected in series to a gate terminal of the triac. The first resistive element and the second resistive element have different heat capacities.

A triac driving circuit according to an aspect of the present disclosure includes a triac connected between an alternating current source and a load, a phototriac coupler configured to transmit a signal to the triac, a first resistive element, and a second resistive element. The phototriac coupler, the first resistive element, and the second resistive element are connected in series to a gate terminal of the triac. The first resistive element and the second resistive element are different in radiation performance.

A triac driving circuit according to an aspect of the present disclosure includes a triac connected between an alternating current source and a load, a phototriac coupler configured to transmit a signal to the triac, a first resistive element, and a second resistive element. The phototriac coupler, the first resistive element, and the second resistive element are connected in series to a gate terminal of the triac. The first resistive element and the second resistive element are different in temperature coefficient of resistance.

Further features of the disclosure will become apparent from the following description of exemplary embodiments with reference to the attached drawings.

DESCRIPTION OF THE EMBODIMENTS

First Embodiment

Figure 1:
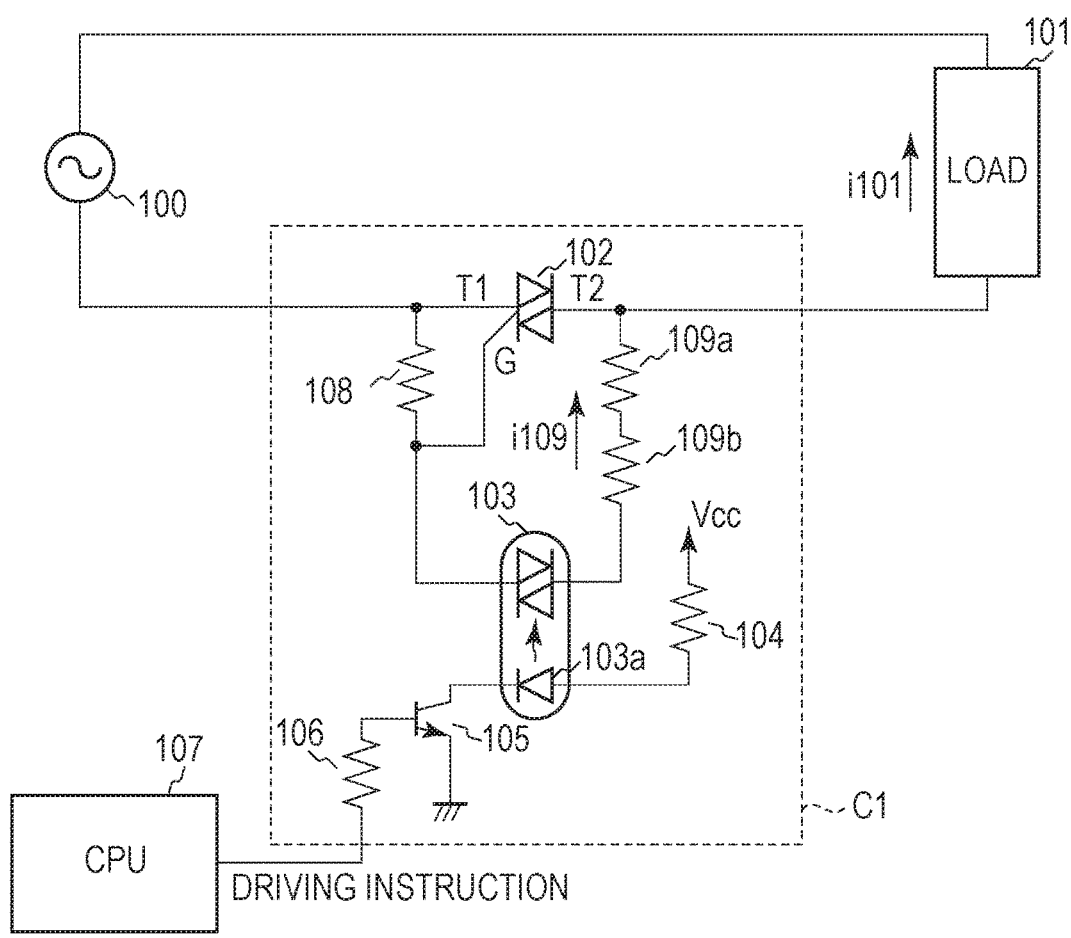
FIG. 1 is a circuit diagram of a power supply apparatus equipped with a triac driving circuit according to a first embodiment of the present disclosure.

FIG. 1 illustrates a power supply apparatus equipped with a triac driving circuit C1 according to a first embodiment. In FIG. 1, a commercial alternating current power source (an AC source) 100 and a load 101 are connected together via a terminal T1 and a terminal T2 of a triac 102. The power to be supplied to the load 101 is controlled by energizing or shutting off (turning on or off) the triac 102. The triac 102 is turned on when a light emitting diode 103a in a phototriac coupler 103 that ensures electrical insulation between the primary side and the secondary side is energized. A resistor 104 is a resistive element used to limit a current to the light emitting diode 103a. The phototriac coupler 103 is turned on or off using a transistor 105. The transistor 105 is connected to a CPU 107 via a resistor 106 and operates according to a driving signal output from the CPU 107.

Resistors 108, 109a, and 109b connected between the triac 102 and the phototriac coupler 103 are bias resistors for driving the triac 102. The phototriac coupler 103, the bias resistor 109a (a first resistive element), and the bias resistor 109b (a second resistive element) are connected in series to the gate terminal G of the triac 102.

In the present embodiment, the relationship between the minimum resistance Ra(min) of the bias resistor 109a including a tolerance and the maximum resistance Rb(max) of the bias resistor 109b including a tolerance is set to Ra(min)>Rb(max). Differentiating the resistance values of the two resistive elements in this manner helps preventing damage to the phototriac coupler in the event of malfunction, such as short-circuit. Preferably, the maximum resistance of the bias resistor 109b is within 50-95% of range of the minimum resistance of the bias resistor 109a.

Figure 2:
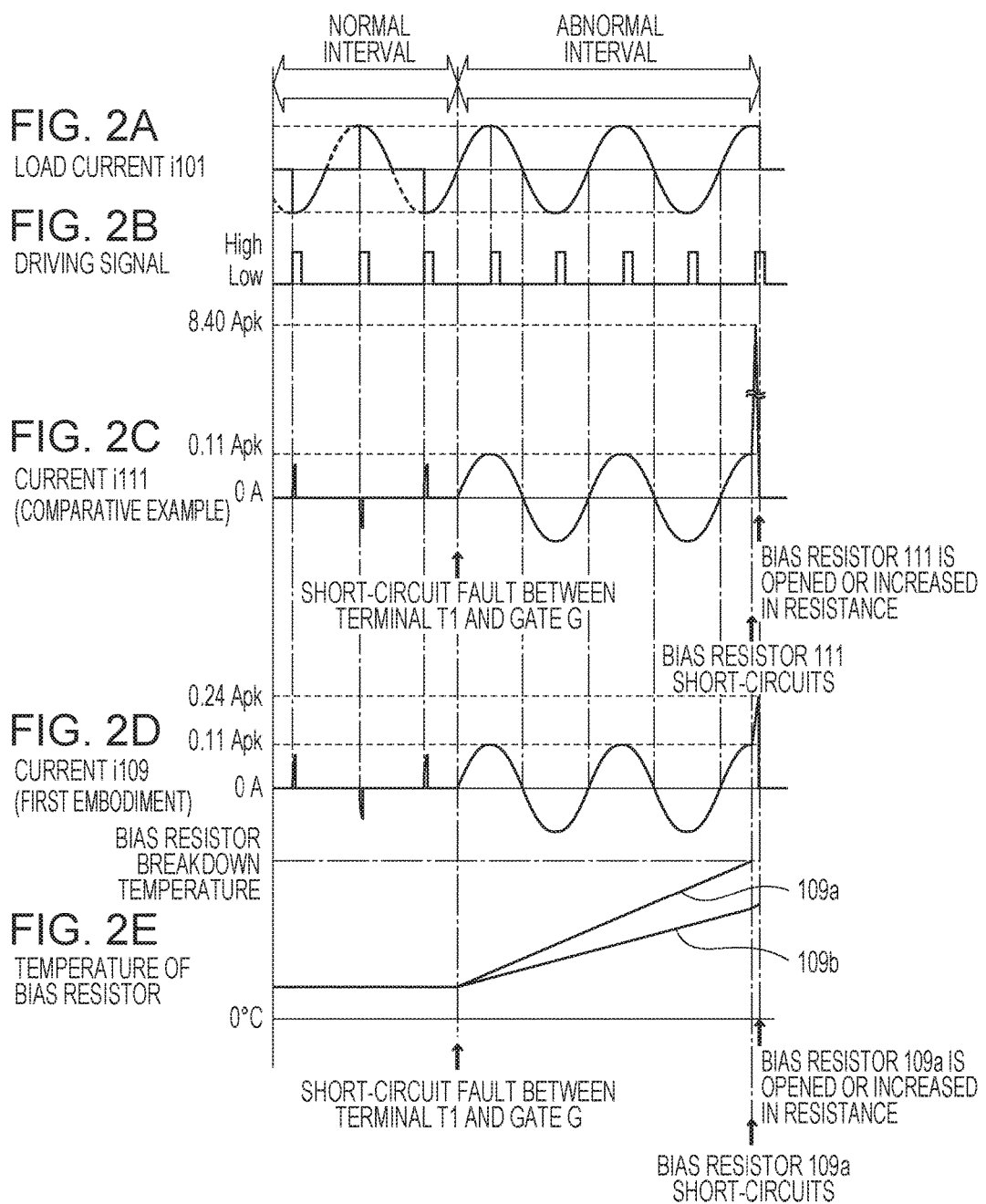
FIGS. 2A to 2E are diagrams illustrating temperature transition of bias resistors at the occurrence of abnormality according to the first embodiment and a comparative example.
Figure 11:
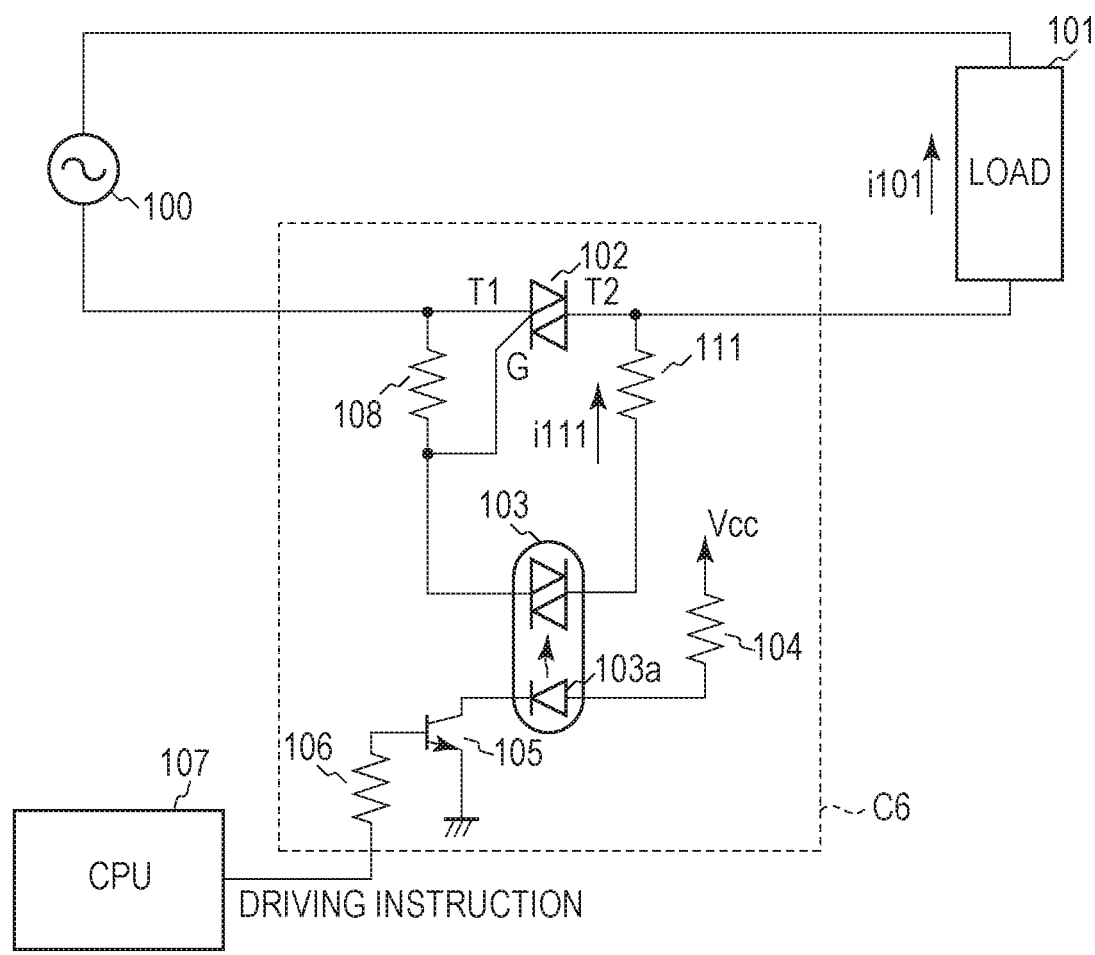
FIG. 11 is a circuit diagram of a power supply apparatus equipped with a triac driving circuit according to the comparative example.

FIGS. 2A to 2B illustrate the transition of the operation (a driving signal output from the CPU 107), a current flowing to the phototriac coupler 103, and the temperatures of the bias resistors of each of the triac driving circuit C1 of the first embodiment and a triac driving circuit C6 of a comparative example. The triac driving circuit C1 of the first embodiment is the circuit illustrated in FIG. 1. The triac driving circuit C6 of the comparative example is the circuit illustrated in FIG. 11. The configurations and operating conditions of the triac driving circuits C1 and C6 are as follows.

Triac 102: turned on at a phase angle of 90° (duty ratio 50%)

Commercial alternating current power source voltage=120 Vrms

Load 101=20 Ω

Bias resistor 109a=820Ω (±5% tolerance), rated power 0.25 W

Bias resistor 109b=680Ω (±5% tolerance), rated power 0.25 W

Bias resistor 111=1.5 kΩ, rated power 0.25 W

A case in which a short-circuit fault has occurred between the terminal T1 and the gate terminal G will be described with reference to FIGS. 2A to 2E.

As illustrated in FIGS. 2A and 2B, when the driving signal output from the CPU 107 goes to High, the triac 102 is conducting from the timing of High until the voltage of the commercial alternating current power source 100 reaches zero volt. This causes a load current i101 to flow to the load 101 (the solid line in the normal interval in FIG. 2A). FIGS. 2C and 2D illustrate currents i111 and i109 flowing through the phototriac coupler 103. As illustrated in the normal interval, the currents i111 and i109 are pulsed currents flowing from the timing at which the phototriac coupler 103 is turned on at the timing when the driving signal goes to High until the timing at which the triac 102 is turned on.

Next, a case in which a short-circuit fault occurs between the terminal T1 and the gate terminal G (the abnormal interval in FIGS. 2A to 2E) will be described. In the comparative example, an alternating current source voltage 120 Vrms is applied to the bias resistor 111 and the load 101 at the timing when a short-circuit fault occurs between the terminal T1 and the gate terminal G, so that an excessive current of about 0.11 Apk flows through the bias resistor 111. This causes the bias resistor 111 to generate heat, leading to breakdown. The bias resistor 111, if it is inexpensive and small, may be short-circuited, or broken.

In the case of the comparative example, when the bias resistor 111 short-circuits, a short-circuit current i111 as high as about 8.4 Apk flows momentarily through the phototriac coupler 103 by the time when the bias resistor 111 is opened or increases in resistance, as illustrated in FIG. 2C. This current can damage the phototriac coupler 103.

Also in the first embodiment, when a short-circuit fault occurs between the terminal T1 and the gate terminal G, an excessive current of about 0.11 Apk flows through the bias resistors 109a and 109b, as illustrated in the abnormal interval in FIG. 2D. This causes the bias resistors 109a and 109b to generate heat, as illustrated in the abnormal interval in FIG. 2E, causing a breakdown. The minimum resistance Ra(min)(=779Ω(=820-820*5%)) of the bias resistor 109a including tolerance (5%) is higher than the maximum resistance Rb(max) (=714Ω(=680Ω+680*5%)) of the bias resistor 109b including tolerance (5%). Therefore, the bias resistor 109a reaches a breakdown temperature first, resulting in being opened or increasing in resistance. In this case, even if the bias resistor 109a is temporarily short-circuited, the alternating current source voltage is divided by the load 101 and the bias resistor 109b, so that the short-circuit current is limited to about 0.24 Apk. Furthermore, since the period during which the short-circuit current flows is instantaneous, the bias resistor 109b does not reach the breakdown temperature, reducing or eliminating damage to the phototriac coupler 103.

Thus, the triac driving circuit C1 of the first embodiment includes the triac 102 connected between the AC source 100 and the load 101 and the phototriac coupler 103 that transmits a signal to the triac 102. The phototriac coupler 103, the first resistive element 109a, and the second resistive element 109b are connected in series to the gate terminal G of the triac 102. The relationship between the minimum resistance Ra(min) of the bias resistor 109a including a tolerance and the maximum resistance Rb(max) of the bias resistor 109b including a tolerance is set to Ra(min)>Rb(max).

The number of resistive elements connected together with the phototriac coupler 103 in series to the gate terminal G may be three or more. In the present embodiment, it is only required that the number of resistive elements is two or more. This is also the same for second to fifth embodiments described below.

When an abnormality occurs in which a short circuit occurs between the terminal T2 and the gate terminal G, a power supply circuit between the AC source 100 and the load 101 not via the phototriac coupler 103 is formed. In this case, for example, a protection circuit that monitors the temperature of the load 101 and interrupts the power supply circuit may be separately provided. Therefore, a plurality of bias resistors 108 may not necessarily be provided.

Second Embodiment

Figure 3:
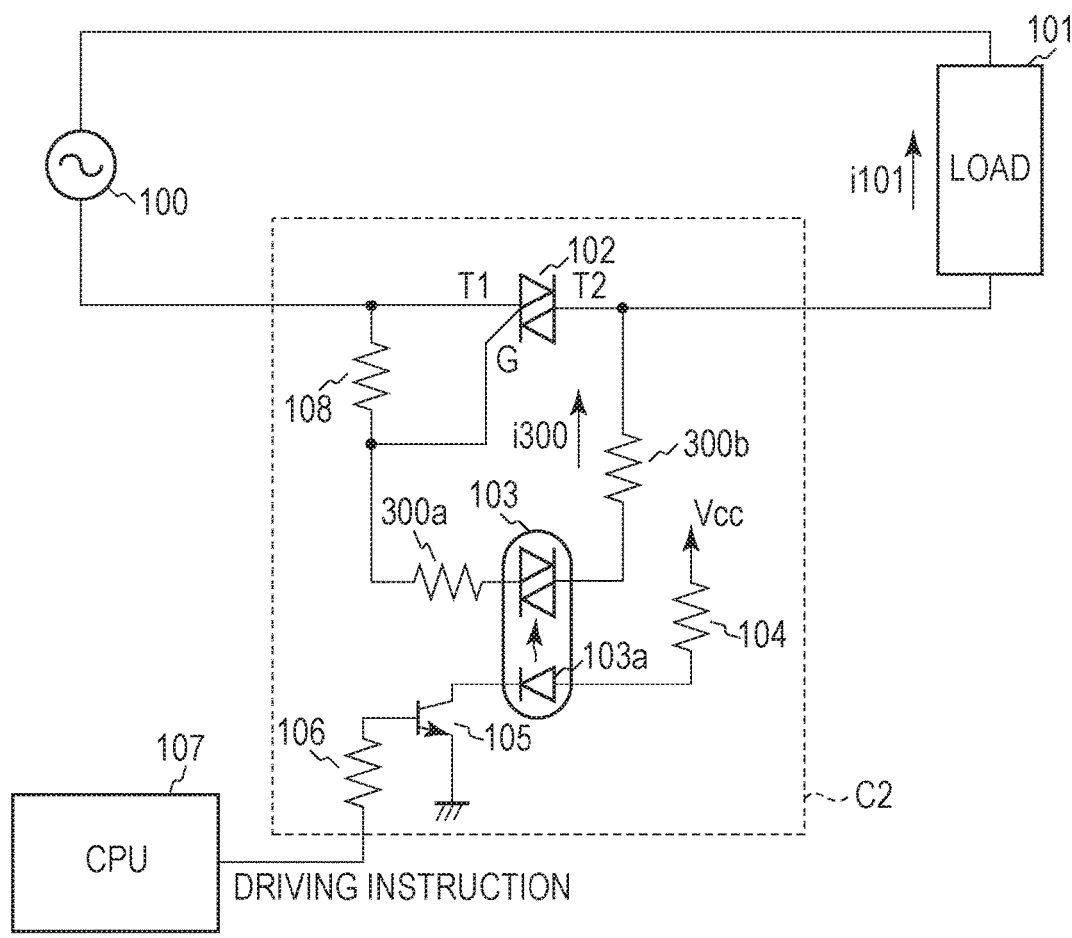
FIG. 3 is a circuit diagram of a power supply apparatus equipped with a triac driving circuit according to a second embodiment of the present disclosure.
Figure 4:
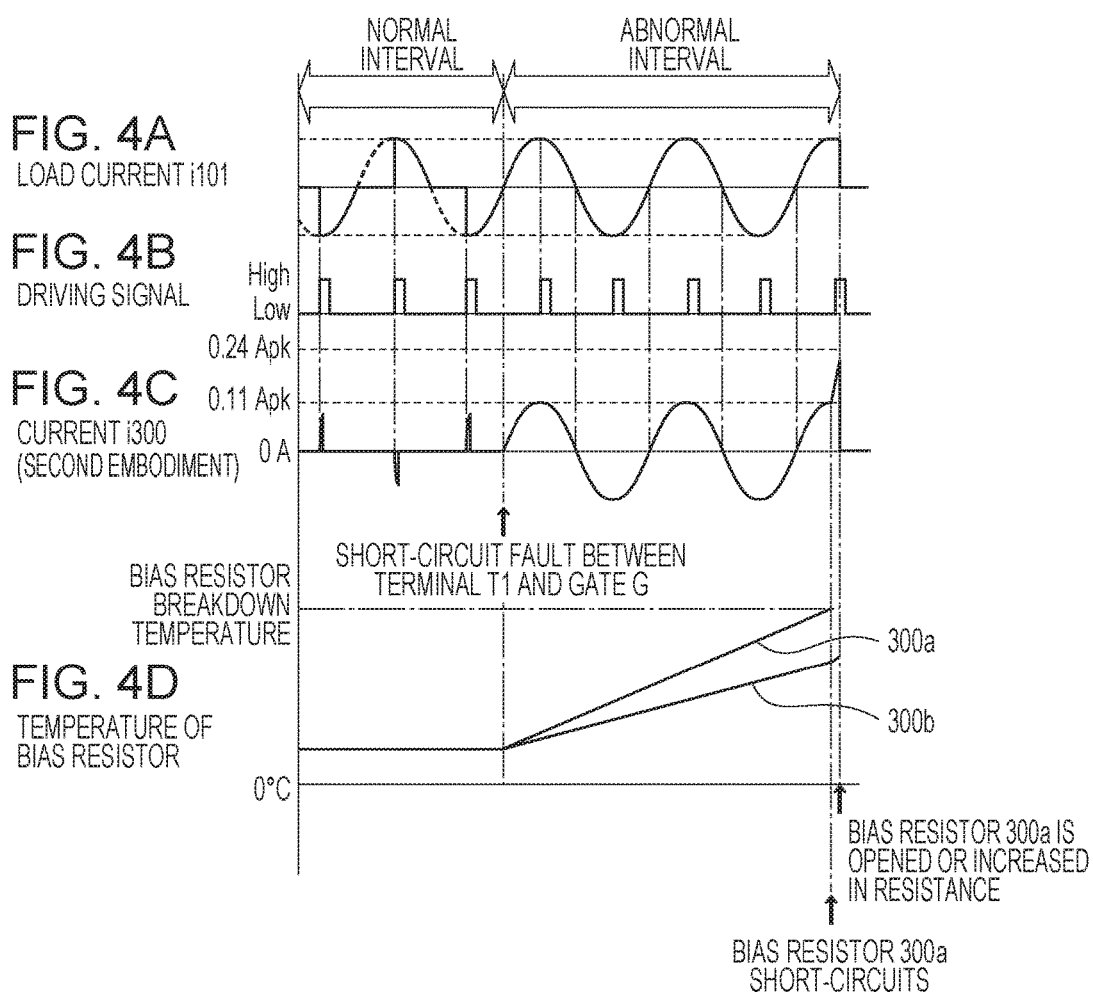
FIGS. 4A to 4D are diagrams illustrating temperature transition of bias resistors at the occurrence of abnormality according to the second embodiment.

FIG. 3 illustrates a power supply apparatus equipped with a triac driving circuit C2 according to a second embodiment. The triac driving circuit C2 includes a phototriac coupler 103, a bias resistor (a first resistive element) 300a, and a bias resistor (a second resistive element) 300b, which are connected in series to the gate terminal G of the triac 102, like the triac driving circuit C1 of the first embodiment.

The difference between the triac driving circuit C2 and the triac driving circuit C1 is that the heat capacity of the bias resistor 300a is set smaller than the heat capacity of the bias resistor 300b. The relationship between the volume Va of the bias resistor 300a and the volume Vb of the bias resistor 300b is Va<Vb. The heat capacity of the bias resistor 300a is made smaller than the heat capacity of the bias resistor 300b by satisfying the relationship. For example, in the case where the bias resistors 300a and 300b are chip resistive elements, the bias resistor 300a is formed in 1608 size, and the bias resistor 300b is formed in 3216 size. The 1608 size is 1.6 mm×0.8 mm×0.45 mm, and the 3216 size is 3.2 mm×1.6 mm×0.6 mm. Thus differentiating the heat capacities of the two resistive elements 300a and 300b helps preventing damage to the phototriac coupler in the event of malfunction, such as short-circuit.

FIGS. 4A to 4D illustrate the transition of the operation of the triac driving circuit C2 (a driving signal output from the CPU 107), a current flowing to the phototriac coupler 103, and the temperatures of the bias resistors 300a and 300b. The configuration and operation of the triac driving circuit C2 are as follows.

Triac 102: turned on at a phase angle of 90° (duty ratio 50%)
Commercial alternating current power source voltage=120 Vrms
Load 101=20 Ω
Bias resistor 300a=680Ω (±5% tolerance), rated power 0.1 W
Bias resistor 300b=680Ω (±5% tolerance), rated power 0.25 W A case in which a short-circuit fault has occurred between the terminal T1 and the gate terminal G will be described with reference to FIGS. 4A to 4D.

As illustrated in FIGS. 4A to 4D, an alternating current source voltage of 120 Vrms is applied to the bias resistors 300a and 300b and the load 101 at a timing when a short-circuit fault between the terminal T1 and the gate terminal G occurs. An excessive current of about 0.11 Apk flows through the bias resistors 300a and 300b. This causes the bias resistors 300a and 300b to generate heat, causing a breakdown.

The heat capacity Va of the bias resistor 300a is smaller than the heat capacity Vb of the bias resistor 300b. Therefore, the bias resistor 300a reaches a breakdown temperature first, resulting in being opened or increasing in resistance. In this case, even if the bias resistor 300a is temporarily short-circuited, the alternating current source voltage is divided by the load 101 and the bias resistor 300b, so that the short-circuit current is limited to about 0.24 Apk. Furthermore, since the period during which the short-circuit current flows is instantaneous, the bias resistor 300b does not reach the breakdown temperature, reducing or eliminating damage to the phototriac coupler 103.

The relationship between the volume Va of the bias resistor 300a and the volume Vb of the bias resistor 300b may be Va>Vb. In this case, the bias resistor 300b is first opened or increased in resistance at the occurrence of abnormality as described above to generate a short-circuit current. The bias resistor 300a limits the short-circuit current, thereby reducing damage to the phototriac coupler 103.

Thus, the triac driving circuit C2 of the second embodiment includes the triac 102 connected between the AC source 100 and the load 101 and the phototriac coupler 103 that transmits a signal to the triac 102. The phototriac coupler 103, the first resistive element 300a, and the second resistive element 300b are connected in series to the gate terminal G of the triac 102. The heat capacity of the first resistive element 300a and the heat capacity of the second resistive element 300b differ.

Third Embodiment

Figure 5:
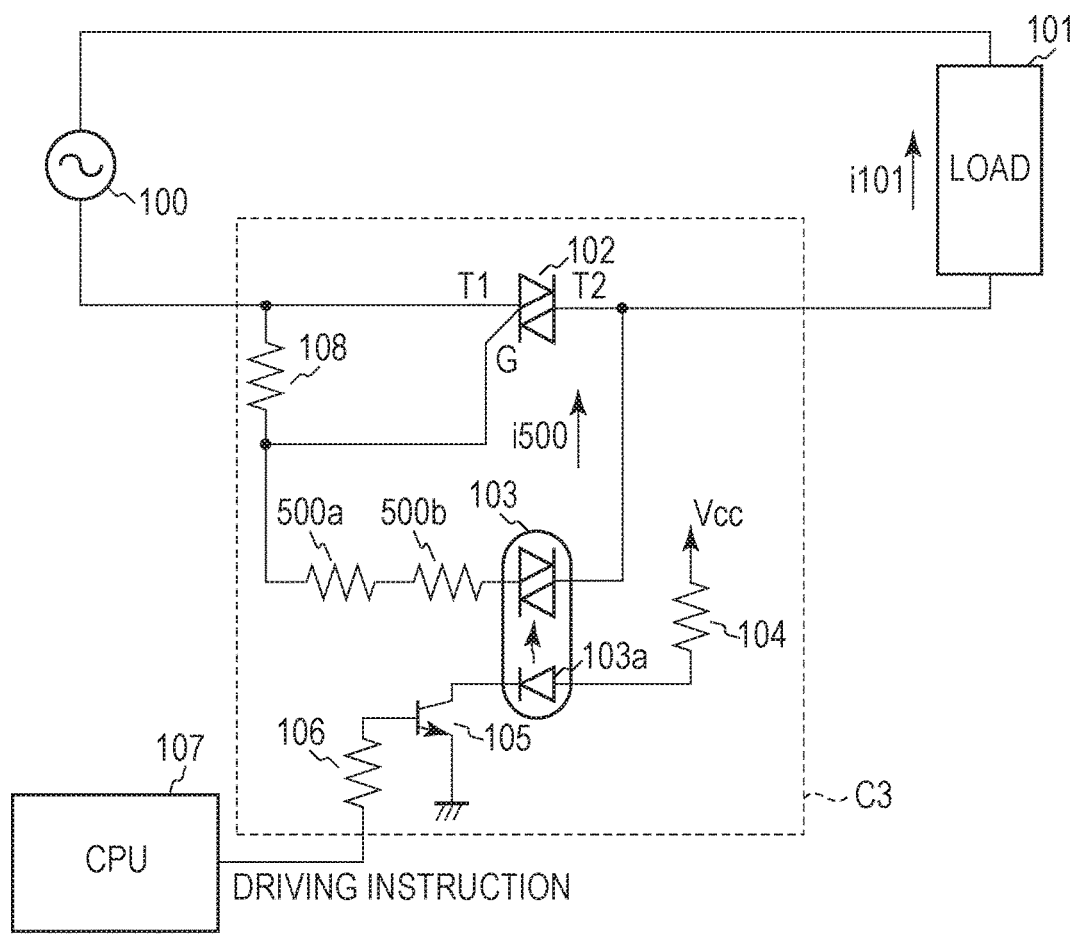
FIG. 5 is a circuit diagram of a power supply apparatus equipped with a triac driving circuit according to a third embodiment of the present disclosure.
Figure 6:
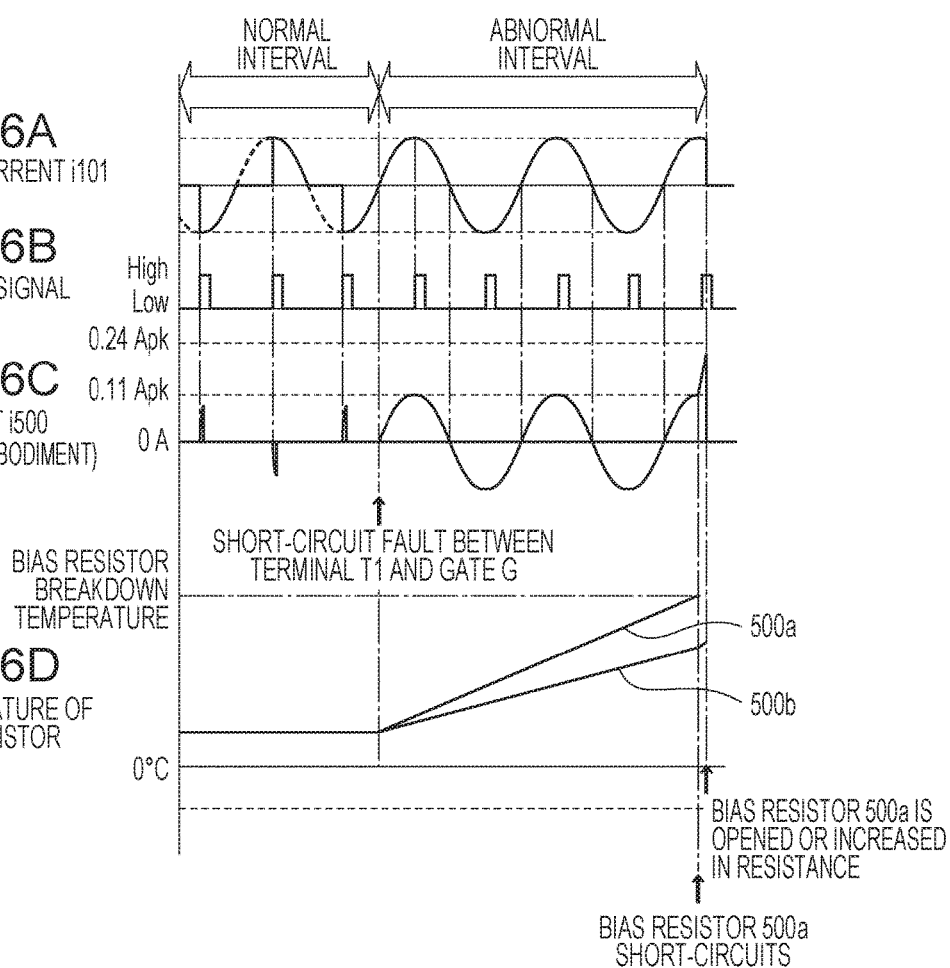
FIGS. 6A to 6D are diagrams illustrating temperature transition of bias resistors at the occurrence of abnormality according to the third embodiment.

FIG. 5 illustrates a power supply apparatus equipped with a triac driving circuit C3 according to a third embodiment. The triac driving circuit C3 includes a phototriac coupler 103, a bias resistor (a first resistive element) 500a, and a bias resistor (a second resistive element) 500b, which are connected in series to the gate terminal G of the triac 102, like the triac driving circuit C1 of the first embodiment.

The difference between the triac driving circuit C3 and the triac driving circuit C1 is that the radiation performance of the bias resistor 500a is set lower than the radiation performance of the bias resistor 500b. The relationship between the radiation performance Ta of the bias resistor 500a and the radiation performance Tb of the bias resistor 500b is Ta<Tb. For example, in the case where the bias resistors 500a and 500b are 3216-size chip resistive elements, the bias resistor 500a is formed in 3216 mounting land size, and the bias resistor 500b is formed in 3225 mounting land size smaller than the 3216 size. The area of a conductor pattern connected to the bias resistor 500a may be smaller than the area of a conductor pattern connected to the bias resistor 500b. Thus differentiating the radiation performance of the two resistive elements 500a and 500b helps preventing damage to the phototriac coupler in the event of malfunction, such as short-circuit.

FIGS. 6A to 6D illustrate the transition of the operation of the triac driving circuit C3 (a driving signal output from the CPU 107), a current flowing to the phototriac coupler 103, and the temperatures of the bias resistors 500a and 500b. The configuration and operation of the triac driving circuit C3 are as follows.

Triac 102: turned on at a phase angle of 90° (duty ratio 50%)
Commercial alternating current power source voltage=120 Vrms
Load 101=20 Ω
Bias resistor 500a=680Ω (±5% tolerance), rated power 0.25 W
Bias resistor 500b=680Ω (±5% tolerance), rated power 0.25 W A case in which a short-circuit fault has occurred between the terminal T1 and the gate terminal G will be described with reference to FIGS. 6A to 6D.

As illustrated in FIGS. 6A to 6D, an alternating current source voltage of 120 Vrms is applied to the bias resistors 500a and 500b and the load 101 at a timing when a short-circuit fault between the terminal T1 and the gate terminal G occurs. An excessive current of about 0.11 Apk flows through the bias resistors 500a and 500b. This causes the bias resistors 500a and 500b to generate heat, causing a breakdown.

The radiation performance Ta of the bias resistor 500a is lower than the radiation performance Tb of the bias resistor 500b. Therefore, the bias resistor 500a reaches a breakdown temperature first, resulting in being opened or increasing in resistance. In this case, even if the bias resistor 500a is temporarily short-circuited, the alternating current source voltage is divided by the load 101 and the bias resistor 500b, so that the short-circuit current is limited to about 0.24 Apk. Furthermore, since the period during which the short-circuit current flows is instantaneous, the bias resistor 500b does not reach the breakdown temperature, reducing or eliminating damage to the phototriac coupler 103.

The relationship between the radiation performance Ta of the bias resistor 500a and the radiation performance Tb of the bias resistor 500b may be Ta>Tb. In this case, the bias resistor 500b is first opened or increased in resistance at the occurrence of abnormality as described above to generate a short-circuit current. The bias resistor 500a limits the short-circuit current, thereby reducing damage to the phototriac coupler 103.

Thus, the triac driving circuit C3 of the third embodiment includes the triac 102 connected between the AC source 100 and the load 101 and the phototriac coupler 103 that transmits a signal to the triac 102. The phototriac coupler 103, the first resistive element 500a, and the second resistive element 500b are connected in series to the gate terminal G of the triac 102. The radiation performance of the first resistive element 500a and the radiation performance of the second resistive element 500b differ.

Fourth Embodiment

Figure 7:
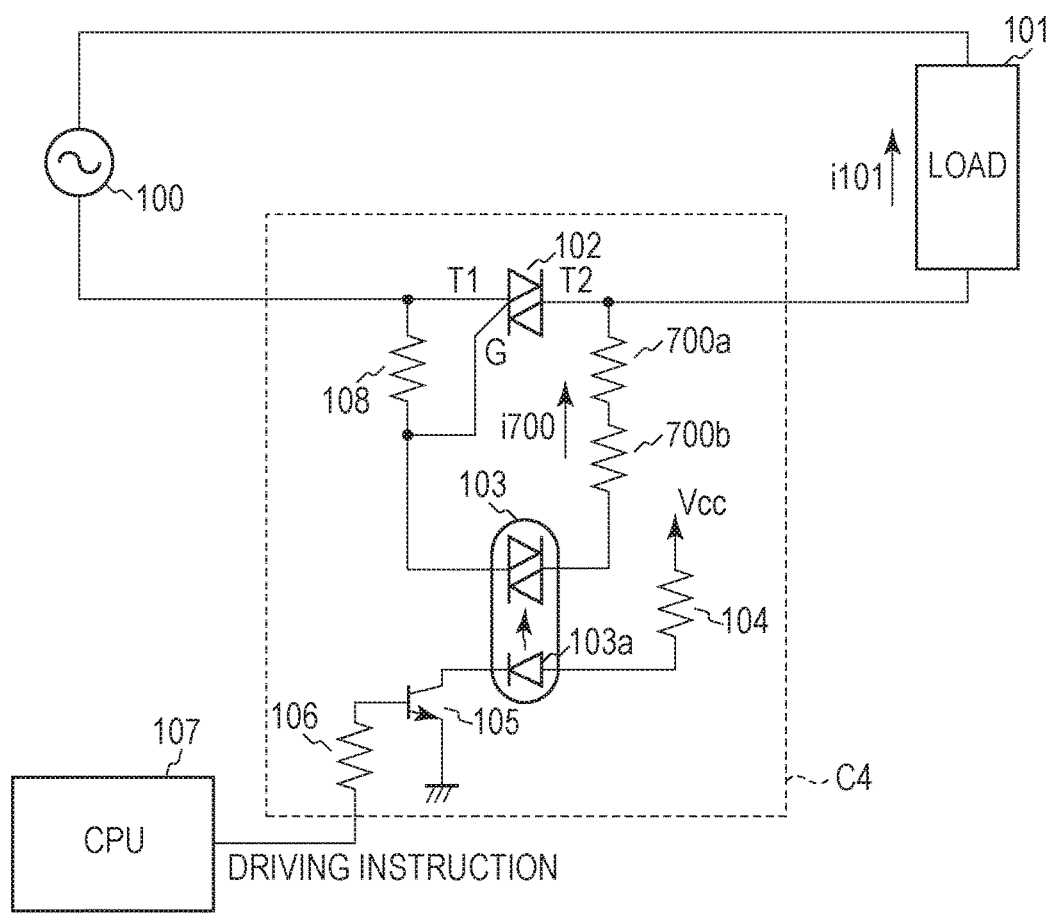
FIG. 7 is a circuit diagram of a power supply apparatus equipped with a triac driving circuit according to a fourth embodiment of the present disclosure.
Figure 8:
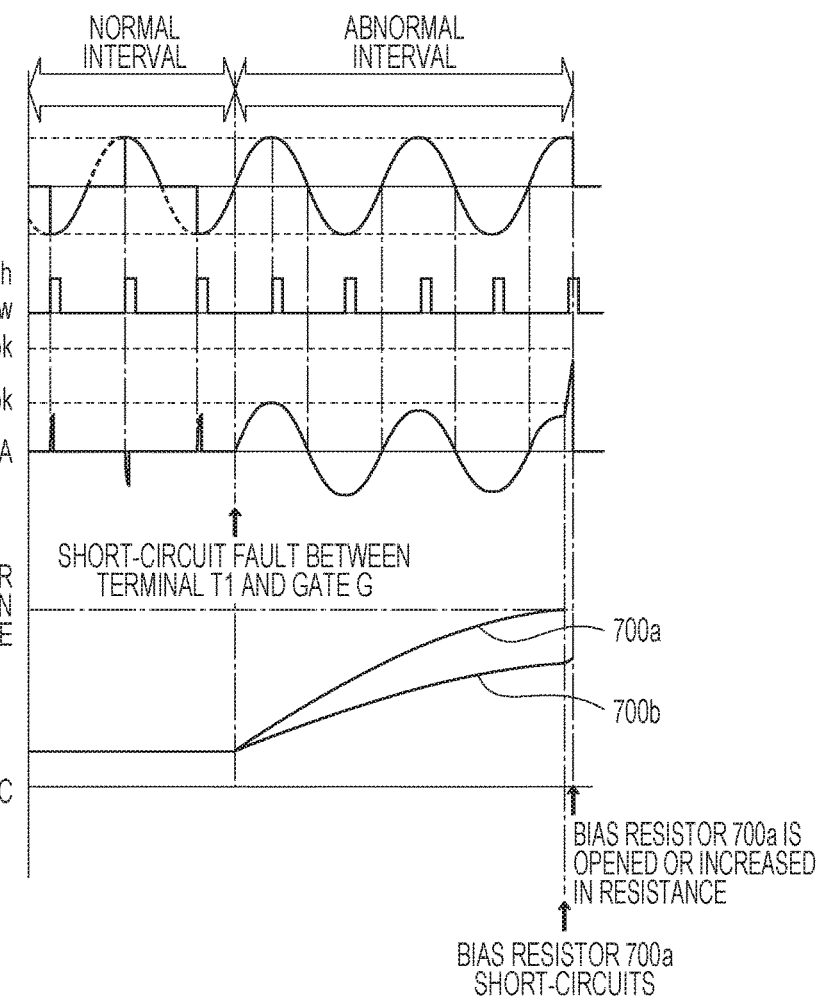
FIGS. 8A to 8D are diagrams illustrating temperature transition of bias resistors at the occurrence of abnormality according to the fourth embodiment.

FIG. 7 illustrates a power supply apparatus equipped with a triac driving circuit C4 according to a fourth embodiment. The triac driving circuit C4 includes a phototriac coupler 103, a bias resistor (a first resistive element) 700a, and a bias resistor (a second resistive element) 700b, which are connected in series to the gate terminal G of the triac 102, like the triac driving circuit C1 of the first embodiment.

The difference between the triac driving circuit C4 and the triac driving circuit C1 is that the temperature coefficient of resistance (TCR) of the bias resistor 700a is set higher than the temperature coefficient of resistance of the bias resistor 700b. The relationship between the temperature coefficient of resistance, TCRa, of the bias resistor 700a and the temperature coefficient of resistance, TCRb, of the bias resistor 700b is TCRa>TCRb. For example, the temperature coefficient of resistance, TCRa, of the bias resistor 700a is set to 1,000 ppm/° C., and the temperature coefficient of resistance, TCRb, of the bias resistor 700b is set to 500 ppm/° C. Thus differentiating the temperature coefficient of resistance of the two resistive elements 700a and 700b helps preventing damage to the phototriac coupler in the event of malfunction, such as short-circuit. Preferably, the temperature coefficient of resistance of the bias resistor 700b is within 5-75% of range of the temperature coefficient of resistance of the bias resistor 700a.

FIGS. 8A to 8D illustrate the transition of the operation of the triac driving circuit C4 (a driving signal output from the CPU 107), a current flowing to the phototriac coupler 103, and the temperatures of the bias resistors 700a and 700b. The configuration and operation of the triac driving circuit C4 are as follows.

Triac 102: turned on at a phase angle of 90° (duty ratio 50%)
Commercial alternating current power source voltage=120 Vrms
Load 101=20 Ω
Bias resistor 700a=680Ω (±5% tolerance), rated power 0.25 W, TCRa=1,000 ppm/° C.
Bias resistor 700b=680Ω (±5% tolerance), rated power 0.25 W, TCRb=500 ppm/° C.

A case in which a short-circuit fault has occurred between the terminal T1 and the gate terminal G will be described with reference to FIGS. 8A to 8D.

As illustrated in FIGS. 8A to 8D, an alternating current source voltage of 120 Vrms is applied to the bias resistors 700a and 700b and the load 101 at a timing when a short-circuit fault between the terminal T1 and the gate terminal G occurs. An excessive current of about 0.11 Apk flows through the bias resistors 700a and 700b.

The temperature coefficient of resistance, TCRa, of the bias resistor 700a is higher than the temperature coefficient of resistance, TCRb, of the bias resistor 700b. Therefore, the bias resistor 700a reaches a breakdown temperature first, resulting in being opened or increasing in resistance, although a current i700 flowing to the phototriac coupler 103 decreases to a certain extent. In this case, even if the bias resistor 700a is temporarily short-circuited, the alternating current source voltage is divided by the load 101 and the bias resistor 700b, so that the short-circuit current is limited to about 0.24 Apk. Furthermore, since the period during which the short-circuit current flows is instantaneous, the bias resistor 700b does not reach the breakdown temperature, reducing or eliminating damage to the phototriac coupler 103.

The relationship between the temperature coefficient of resistance, TCRa, of the bias resistor 700a and the temperature coefficient of resistance, TCRb, of the bias resistor 700b may be TCRa<TCRb. In this case, the bias resistor 700b is first opened or increased in resistance at the occurrence of abnormality as described above to generate a short-circuit current. The bias resistor 700a limits the short-circuit current, thereby reducing damage to the phototriac coupler 103.

Thus, the triac driving circuit C4 of the fourth embodiment includes the triac 102 connected between the AC source 100 and the load 101 and the phototriac coupler 103 that transmits a signal to the triac 102. The phototriac coupler 103, the first resistive element 700a, and the second resistive element 700b are connected in series to the gate terminal G of the triac 102. The temperature coefficient of resistance of the first resistive element 700a and the temperature coefficient of resistance of the second resistive element 700b differ.

Fifth Embodiment

Next, a power supply apparatus according to a fifth embodiment will be described. A triac driving circuit C5 illustrated in FIG. 9 includes a phototriac coupler 103, a bias resistor 900a, and a bias resistor 900b, which are connected in series to the gate terminal G of the triac 102, as in the first to fourth embodiments.

The difference between the power supply apparatuses of the firsts to fourth embodiment and the power supply apparatus of the fifth embodiment is that the load 101 includes a heater (a ceramic heater) 901 that generates heat when supplied with power from the commercial alternating current power source 100. The heater 901 is mounted to a fixing apparatus 123 installed in a known electrophotographic printer.

Figure 10:
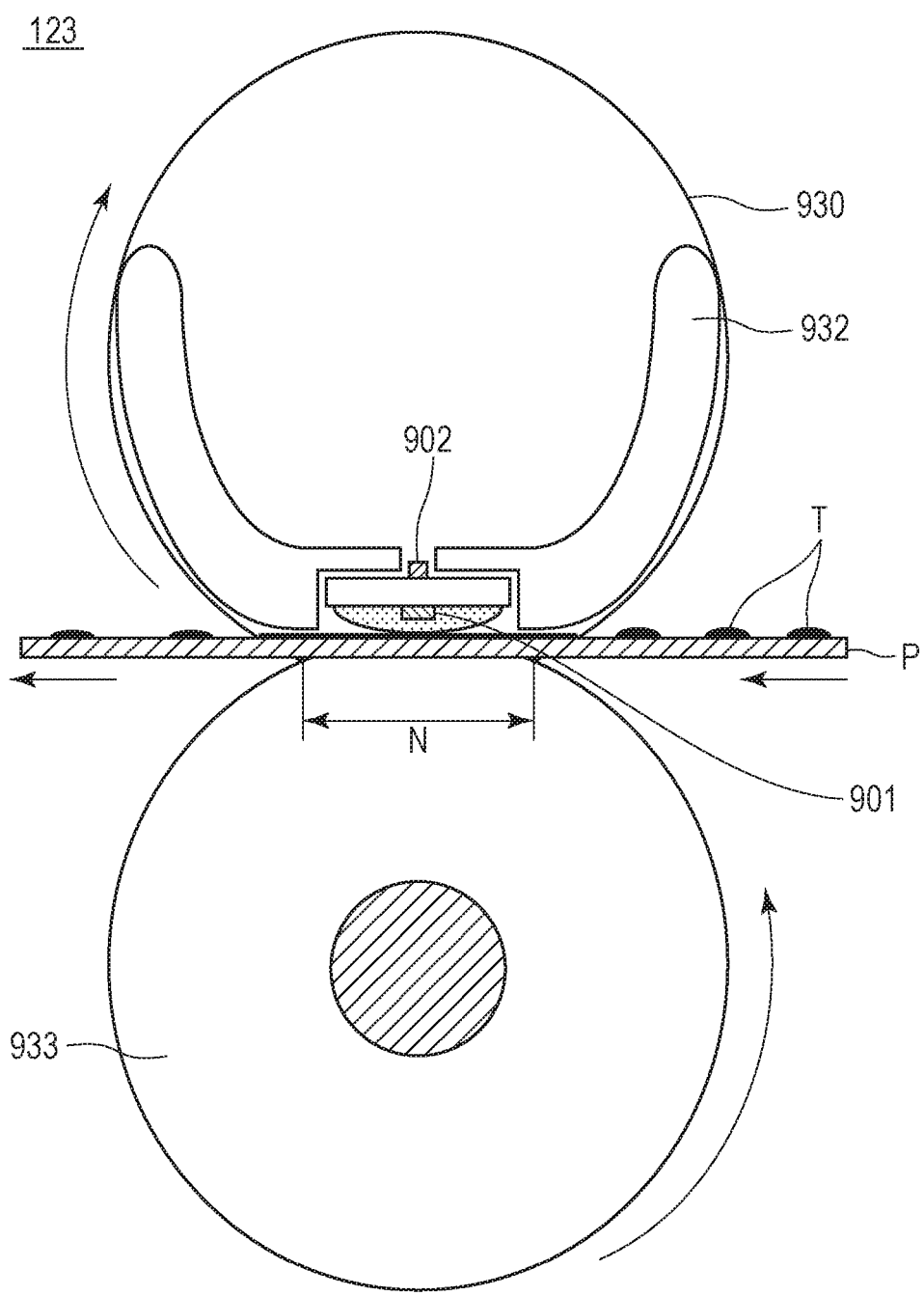
FIG. 10 is a cross-sectional view of a fixing apparatus.

FIG. 10 is a cross-sectional view of the fixing apparatus 123. The fixing apparatus 123 includes a cylindrical fixing film 930, the heater 901, which is in contact with the inner surface of the fixing film 930, and a roller 933, which forms a fixing nip N with the heater 901 with the fixing film 930 therebetween. A printing material P which carries an unfixed toner image T formed at an image forming unit of the printer is nipped and conveyed at a fixing nip N. When the printing material P is conveyed at the fixing nip N, the unfixed toner image T is melted by heat from the heater 901 to be fixed to the printing material P. The heater 901 is formed by printing a resistance heating element on a ceramic substrate made from alumina or the like and covering the surface with an insulating layer, such as glass. The heater 901 is held by a heater holder 932 formed from a heat resistant resin. The heater holder 932 also serves as a guide that guides the rotation of the fixing film 930.

The fixing apparatus 123 includes a temperature detecting element 902, such as a thermistor, for detecting the temperature of the heater 901. The CPU 107 outputs a driving signal to the triac driving circuit C5 based on the detection result from the temperature detecting element 902. As illustrated in FIG. 10, the temperature detecting element 902 is pressed against the heater 901 via a hole in the heater holder 932.

Figure 9:
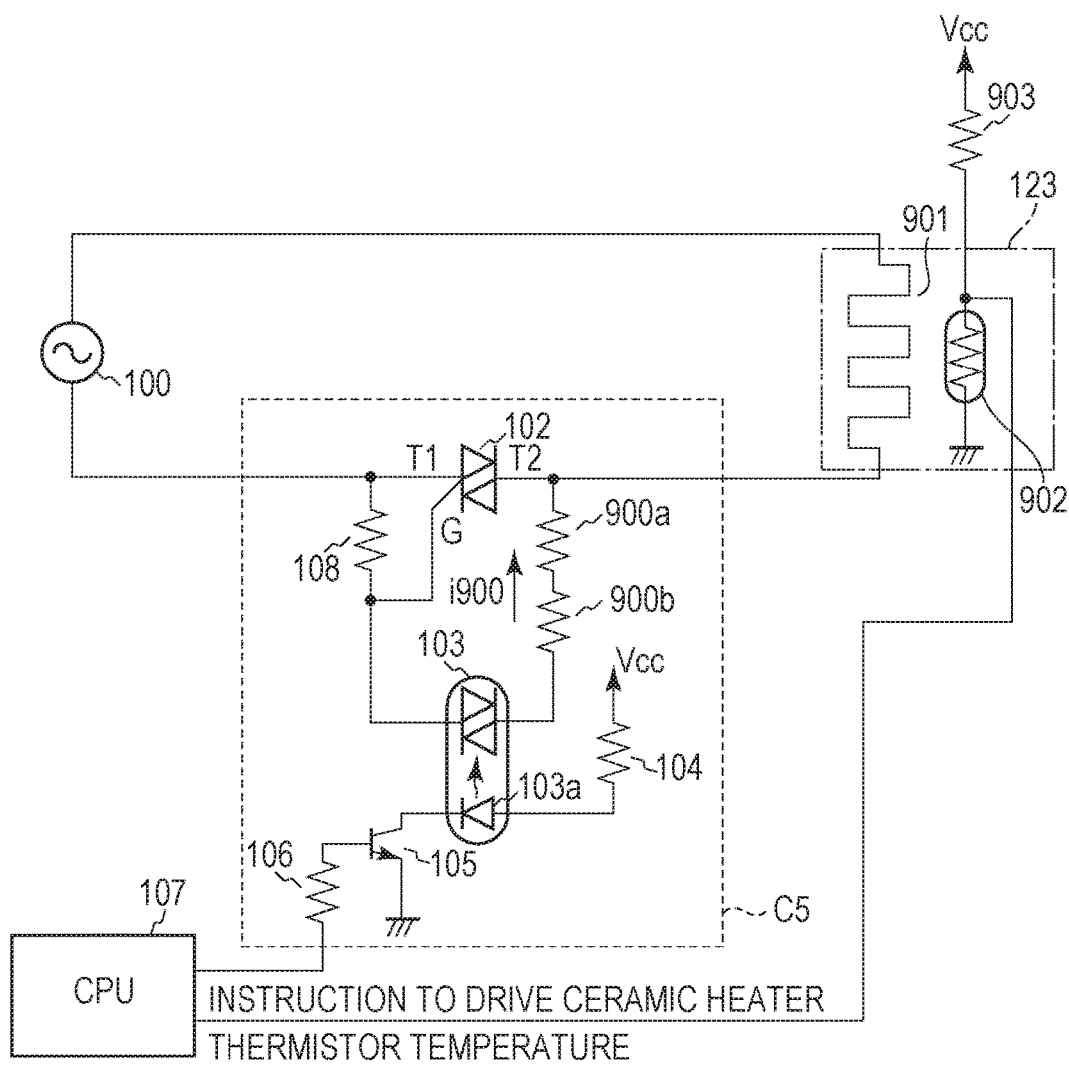
FIG. 9 is a circuit diagram of a heater driving circuit according to a fifth embodiment of the present disclosure.

The power supply apparatus that supplies power to the heater 901 controls the temperature of the heater 901 by controlling the power supplied to the heater 901 from the commercial alternating current power source 100, as illustrated in FIG. 9. A change in the temperature of the heater 901 causes a change in the resistance of the thermistor 902. The CPU 107 detects the change in the resistance of the thermistor 902 according to the temperature change as a voltage divided with the resistance 903. The CPU 107 outputs a heater driving signal based on the input information on the thermistor temperature. Such control allows keeping the heater 901 at a temperature suitable for fixing the toner image.

The triac driving circuit C5 may be any of the triac driving circuits C1 to C4 according to the first to fourth embodiments.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-015195, filed Jan. 31, 2018, which is hereby incorporated by reference herein in its entirety.

What is claimed is:

1. A triac driving circuit comprising:
   a triac connected between an alternating current source and a load;
   a phototriac coupler configured to transmit a signal to the triac;
   a first resistive element; and
   a second resistive element,
   wherein the phototriac coupler, the first resistive element, and the second resistive element are connected in series to a gate terminal of the triac, and
   wherein a minimum resistance of the first resistive element including tolerance is higher than the maximum resistance of the second resistive element including tolerance.

2. The triac driving circuit according to claim 1, wherein the maximum resistance of the second resistive element is within 50-95% of range of the minimum resistance of the first resistive element.

3. A fixing apparatus for fixing an unfixed toner image formed on a printing material to the printing material, the fixing apparatus comprising:
   a heater; and
   the triac driving circuit according to claim 2 configured to drive the heater.

4. The fixing apparatus according to claim 3, further comprising:
   a cylindrical fixing film,
   wherein the heater is in contact with an inner surface of the fixing film.

5. A triac driving circuit comprising:
   a triac connected between an alternating current source and a load;
   a phototriac coupler configured to transmit a signal to the triac;
   a first resistive element; and
   a second resistive element,
   wherein the phototriac coupler, the first resistive element, and the second resistive element are connected in series to a gate terminal of the triac, and
   wherein the first resistive element and the second resistive element have different heat capacities.

6. A fixing apparatus for fixing an unfixed toner image formed on a printing material to the printing material, the fixing apparatus comprising:
   a heater; and
   the triac driving circuit according to claim 5 configured to drive the heater.

7. The fixing apparatus according to claim 6, further comprising:
   a cylindrical fixing film,
   wherein the heater is in contact with an inner surface of the fixing film.

8. A triac driving circuit comprising:
a triac connected between an alternating current source and a load;
a phototriac coupler configured to transmit a signal to the triac;
a first resistive element; and
a second resistive element,
wherein the phototriac coupler, the first resistive element, and the second resistive element are connected in series to a gate terminal of the triac, and
wherein the first resistive element and the second resistive element are different in radiation performance.

9. A fixing apparatus for fixing an unfixed toner image formed on a printing material to the printing material, the fixing apparatus comprising:
a heater; and
the triac driving circuit according to claim 8 configured to drive the heater.

10. The fixing apparatus according to claim 9, further comprising:
a cylindrical fixing film,
wherein the heater is in contact with an inner surface of the fixing film.

11. A triac driving circuit comprising:
a triac connected between an alternating current source and a load;
a phototriac coupler configured to transmit a signal to the triac;
a first resistive element; and
a second resistive element,
wherein the phototriac coupler, the first resistive element, and the second resistive element are connected in series to a gate terminal of the triac, and
wherein the first resistive element and the second resistive element are different in temperature coefficient of resistance.

12. The triac driving circuit according to claim 11, wherein the temperature coefficient of resistance of the second resistive element is within 5-75% of range of the temperature coefficient of resistance of the first resistive element.

13. A fixing apparatus for fixing an unfixed toner image formed on a printing material to the printing material, the fixing apparatus comprising:
a heater; and
the triac driving circuit according to claim 12 configured to drive the heater.

14. The fixing apparatus according to claim 13, further comprising:
a cylindrical fixing film,
wherein the heater is in contact with an inner surface of the fixing film.

* * * * *